United States Patent
Kinoshita et al.

(10) Patent No.: US 11,203,086 B2
(45) Date of Patent: Dec. 21, 2021

(54) LASER WELDING METHOD AND LASER WELDING DEVICE

(71) Applicant: Nissan Motor Co., Ltd., Yokohama (JP)

(72) Inventors: Keisuke Kinoshita, Yokohama (JP); Kazuhiko Kagiya, Yokohama (JP); Mitsuhiro Hasunuma, Zama (JP); Shintaro Nonaka, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/762,749

(22) PCT Filed: Feb. 13, 2014

(86) PCT No.: PCT/JP2014/053373
§ 371 (c)(1),
(2) Date: Jul. 22, 2015

(87) PCT Pub. No.: WO2014/126172
PCT Pub. Date: Aug. 21, 2014

(65) Prior Publication Data
US 2015/0352672 A1    Dec. 10, 2015

(30) Foreign Application Priority Data

Feb. 15, 2013    (JP) .............................. JP2013-028442

(51) Int. Cl.
| | |
|---|---|
| *B23K 26/34* | (2014.01) |
| *B23K 26/20* | (2014.01) |
| *B23K 26/00* | (2014.01) |
| *B23K 26/02* | (2014.01) |
| *B23K 26/22* | (2006.01) |
| *B23K 26/60* | (2014.01) |
| *B23K 26/244* | (2014.01) |

(Continued)

(52) U.S. Cl.
CPC .......... *B23K 26/34* (2013.01); *B23K 26/0006* (2013.01); *B23K 26/0093* (2013.01);
(Continued)

(58) Field of Classification Search
CPC ............ B23K 26/0639; B23K 26/0643; B23K 26/06; B23K 26/0665; B23K 26/032
(Continued)

(56) References Cited

U.S. PATENT DOCUMENTS 8,610,026 B2 * 12/2013 Kobayashi ........... B23K 26/244
                                                   219/121.64
9,012,804 B2 *  4/2015 Takahashi .............. B23K 33/00
                                                   219/121.64
(Continued)

FOREIGN PATENT DOCUMENTS

CN        101695790 A    4/2010
CN        102922817 A    2/2013
(Continued)

*Primary Examiner* — Tu B Hoang
*Assistant Examiner* — Thomas J Ward
(74) *Attorney, Agent, or Firm* — Global IP Counselors, LLP

(57) ABSTRACT

A laser welding method includes a pretreatment process and a welding process. At least one metal member of the plurality of metal members is formed from a metal-plated steel plate in which a base metal has been covered with a coating material that has a melting point lower than the base metal. In the pretreatment process, with the position of the first metal member in the in-plane direction fixed, processing is performed from the front surface of the first metal member to form on the back surface, a protrusion that bulges from the back surface. Then, in the welding process, the first metal member in which a protrusion has been formed is superposed on a second metal member with the protrusion therebetween while maintaining the position in the in-plane direction, and laser light is irradiated on the superposed region to weld the plurality of metal members to each other.

13 Claims, 16 Drawing Sheets

(51) Int. Cl.
*B23K 103/04* (2006.01)
*B23K 101/34* (2006.01)
*B23K 103/08* (2006.01)
*B23K 103/00* (2006.01)

(52) U.S. Cl.
CPC .............. *B23K 26/02* (2013.01); *B23K 26/20* (2013.01); *B23K 26/22* (2013.01); *B23K 26/244* (2015.10); *B23K 26/60* (2015.10); *B23K 2101/34* (2018.08); *B23K 2103/04* (2018.08); *B23K 2103/08* (2018.08); *B23K 2103/50* (2018.08); *Y10T 29/49996* (2015.01)

(58) Field of Classification Search
USPC ............................................ 219/121.6–121.8
See application file for complete search history.

(56) References Cited

U.S. PATENT DOCUMENTS

2006/0175310 A1* 8/2006 Fujimoto ............. B23K 9/0026
219/121.64
2007/0007253 A1* 1/2007 Wang ................... B23K 11/115
219/86.25
2008/0217307 A1* 9/2008 Dauvel .................. B23K 26/22
219/121.64
2011/0278266 A1* 11/2011 Kobayashi ........... B23K 26/244
219/121.64
2012/0160815 A1* 6/2012 Hayashimoto ......... B23K 26/28
219/121.64

FOREIGN PATENT DOCUMENTS

| CN | 102958641 A | 3/2013 |
| JP | 11-47967 A | 2/1999 |
| JP | 2001-162387 A | 6/2001 |
| JP | 2001-162388 A | 6/2001 |
| JP | 2006-315062 A | 11/2006 |
| JP | 2008-49392 A | 3/2008 |
| JP | 2009-285682 A | 12/2009 |
| JP | 2011-173146 A | 9/2011 |
| WO | 9908829 A1 | 2/1999 |
| WO | 2012000106 A1 | 1/2012 |

* cited by examiner

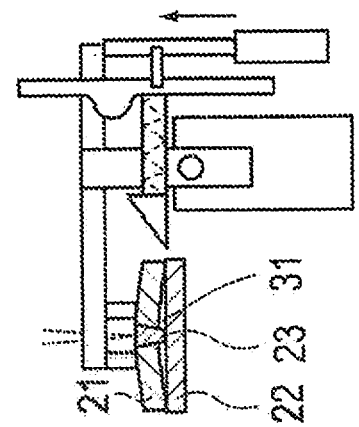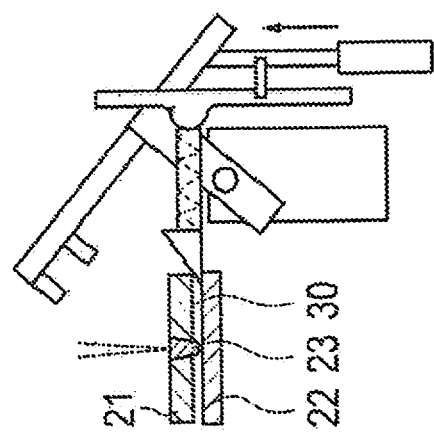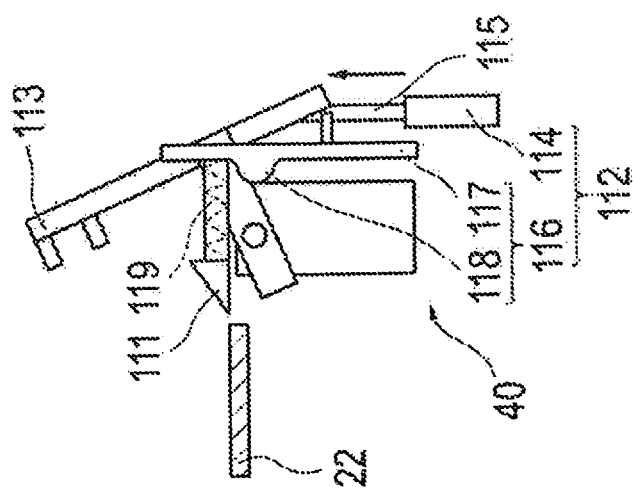

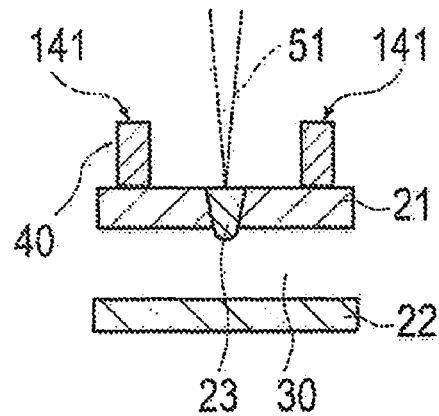
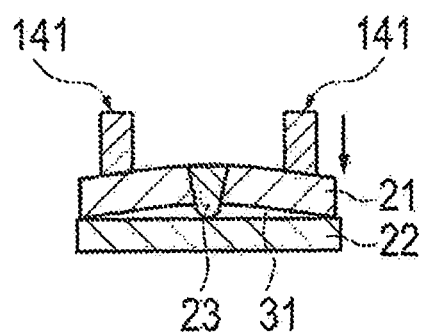
FIG. 13A          FIG. 13B
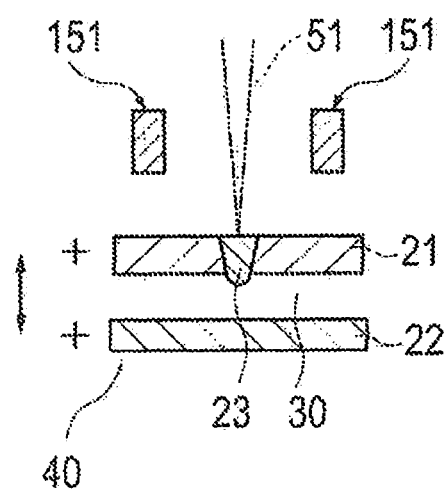
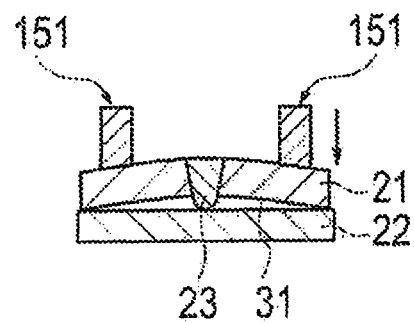
FIG. 14A          FIG. 14B

LASER WELDING METHOD AND LASER WELDING DEVICE

CROSS-REFERENCE TO RELATED APPLICATIONS

This application is a U.S. National stage application of International Application No. PCT/JP2014/053373, filed Feb. 13, 2014, which claims priority to Japanese, which claims priority to Japanese No. 2013-028442 filed in Japan on Feb. 15, 2013, the contents of each of which is hereby incorporated herein by reference.

BACKGROUND

Field of the Invention

The present invention relates to a laser welding method and a laser welding device.

Background Information

When assembling a vehicle body or a structure of an automobile, normally, a metal member obtained by press molding a steel plate into a desired shape is formed; afterwards, laser light is irradiated onto a portion where parts of a plurality of metal members are superposed to achieve a welding connection (refer to Japanese Laid Open Patent Application No. 2011-173146). That which is formed from a metal-plated steel plate in which the base metal has been covered with a coating material that has a melting point lower than the base metal exists as a metal member for automobiles. An example of a metal-plated steel plate is, for example, galvanized steel sheets in which a base metal is covered with a coating material with zinc, which has excellent corrosion resistance, as the main component.

In the technique disclosed in Japanese Laid Open Patent Application No. 2011-173146, an auxiliary heating process is provided, in which laser light, with an irradiation depth that is shallower than in the welding process, is irradiated on the outer peripheral portion of the laser light irradiation range in the welding process. The metal melting amount at the weld is thereby increased to suppress the generation of a welding defect due to laser welding.

SUMMARY

When welding metal members formed from metal-plated steel plates such as galvanized steel sheets, if there is little gap between the metal members, coating material vapor such as zinc gas generated by irradiating laser light becomes difficult to be released. Consequently, blow holes would occur and favorable welds become difficult to obtain.

In order to solve the problem described above, an object of the present invention is to provide a laser welding method and a laser welding device that are able to suppress the occurrence of blow holes and obtain a favorable weld.

The laser welding method of the present invention which achieves the object above is a laser welding method for welding a plurality of metal members to each other by irradiating laser light on a region where the plurality of metal members have been superposed; at least one of the plurality of metal members is formed from a metal-plated steel plate in which the base metal has been covered with a coating material that has a melting point lower than the base metal; and comprises a pretreatment process and a welding process. In the pretreatment process, with the position of one of the metal members in the in-plane direction fixed and holding the plurality of metal members in a combined state with a space therebetween, processing is performed from one side surface of the one metal member to form on the other side surface, which is the other side, a protrusion that bulges from the other surface. In the welding process, while maintaining the positions in the in-plane direction of the plurality of metal members determined in the pretreatment process, the one metal member in which the protrusion has been formed is superposed on another of the metal members with the protrusion therebetween while maintaining the position in the in-plane direction, and laser light is irradiated on the superposed region to weld the plurality of metal members to each other.

The laser welding device of the present invention which achieves the object above is a laser welding device for welding a plurality of metal members to each other by irradiating laser light on a region where the plurality of metal members have been superposed; at least one of the plurality of metal members is formed from a metal-plated steel plate in which the base metal has been covered with a coating material that has a melting point lower than the base metal. The laser welding device comprises a jig unit that freely holds the plurality of metal members in a combined state with a space therebetween, in a state in which the positions of the plurality of metal members in the in-plane direction are fixed, and freely holds the one metal member on the other metal member while maintaining the positions of the plurality of metal members in the in-plane direction fixed, and freely holds the one metal member superposed on the other metal member while maintaining the positions of the plurality of metal members in the in-plane direction, a pretreatment unit that performs processing from one side surface of the one metal member to form on the other side surface, which is the other side, a protrusion that bulges from the other surface, a laser irradiation unit that irradiates laser light, and a control unit that controls the operations of the jig unit, the pretreatment unit, and the laser irradiation unit. The control—unit first holds the plurality of metal members in a combined state with a space therebetween, in a state in which the positions of the plurality of metal members in the in-plane direction fixed with the jig unit. The control unit causes the pretreatment unit to form the protrusion. Then, the control unit holds the one metal member superposed on the other metal member with the protrusion therebetween while maintaining the positions of the plurality of metal members in the in-plane direction with the jig unit, and irradiates the laser light from the laser irradiation unit to perform welding.

BRIEF DESCRIPTION OF THE DRAWINGS

Referring now to the attached drawings which form a part of this original disclosure.

FIG. 1A illustrates a state of the pretreatment process, and FIG. 1B illustrates a state of the welding process.

FIGS. 2A and 2B are a perspective view illustrating the state of the pretreatment process and a cross-sectional view along the 2B-2B line in FIG. 2A; FIGS. 2C and 2D are a plan view illustrating the state of the welding process and a cross-sectional view along the 2D-2D line in FIG. 2C. FIGS. 2E and 2F are a plan view illustrating another state of the welding process and a cross-sectional view along the 2F-2F line in FIG. 2E.

FIG. 7A is a cross-sectional view illustrating the manner in which a protrusion is formed by scanning laser light in the pretreatment process. FIG. 7B is a plan view illustrating the state of the back surface of one metal member after laser light scanning has ended. FIG. 7C is a cross-sectional view illustrating the state of one metal member after laser light scanning has ended.

FIG. 8A is a cross-sectional view illustrating the manner in which laser light is scanned in order to form a protrusion in the pretreatment process. FIG. 8B is a plan view illustrating the state of the back surface of one metal member after laser light scanning has ended. FIG. 8C is a cross-sectional view illustrating the state of one metal member after laser light scanning has ended.

FIGS. 10A-10C are views illustrating a modified example of a jig unit comprising a mechanical mechanism.

FIGS. 13A and 13B are views illustrating a jig unit that utilizes electromagnetic force.

FIGS. 14A and 14B are views illustrating a modified example of a jig unit that utilizes electromagnetic force.

DETAILED DESCRIPTION OF THE EMBODIMENTS

Figure 1A:
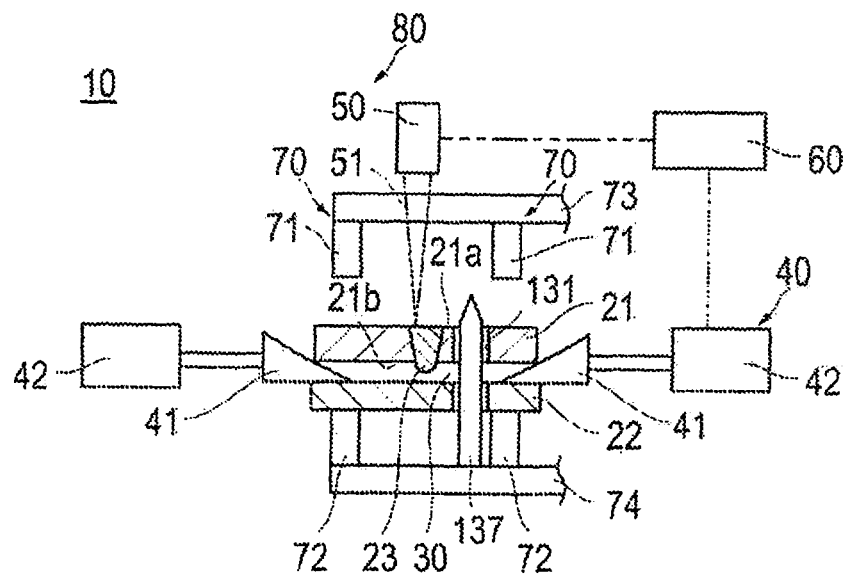
FIGS. 1A and 1B are schematic overviews illustrating the laser welding device according to the present embodiment of the present invention.

Embodiments of the present invention will be explained below, with reference to the appended drawings. In the explanations of the drawings, the same elements are given the same codes, and overlapping explanations are omitted. The dimensional ratios in the drawings are exaggerated for convenience of explanation, and are different from the actual ratios.

Figure 1B:
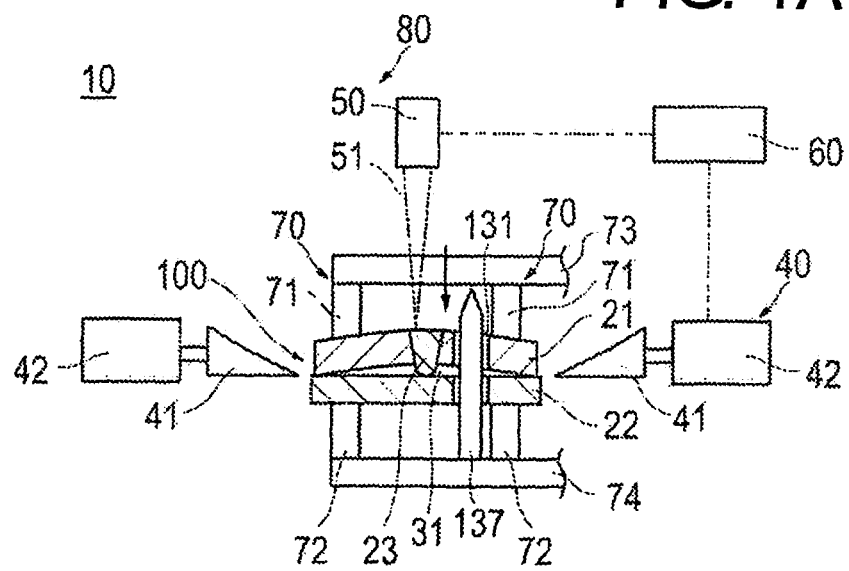

FIGS. 1A and 1B are schematic overviews illustrating the laser welding device 10 according to the present embodiment of the present invention; FIG. 1A illustrates a state of the pretreatment process, and FIG. 1B illustrates a state of the welding process.

Referring to FIGS. 1A and 1B, the laser welding device 10 produces a welded member 100 by welding a plurality of metal members by irradiating laser light 51 on a region where the plurality of metal members have been superposed. At least one metal member of the plurality of metal members is formed from a metal-plated steel plate in which a base metal has been covered with a coating material that has a melting point lower than the base metal. An example of a metal-plated steel plate is, for example, galvanized steel sheets in which a base metal is covered with a coating material with zinc, which has excellent corrosion resistance, as the main component.

The laser welding device 10, in general, comprises a jig unit 40 that freely holds the position of a first metal member 21 (corresponding to one metal member) in the in-plane direction fixed, and freely holds the first metal member 21 superposed on a second metal member 22 (corresponding to another metal member) while maintaining the position in the in-plane direction, a pretreatment unit 80 that performs processing from the front surface 21a (corresponding to one side surface) of the first metal member 21 to form on the back surface surface 21b (corresponding to the other side surface, which is the other side), a protrusion 23 that bulges from the back surface 21b, a laser irradiation unit 50 that irradiates laser light 51, and a control unit 60 that controls the operations of the jig unit 40, the pretreatment unit 80, and the laser irradiation unit 50. The control unit 60 holds the position of the first metal member 21 in the in-plane direction fixed with the jig unit 40. Next, the control unit causes the pretreatment unit 80 to form the protrusion 23 (FIG. 1A). Then, the control unit 60 holds the first metal member 21 superposed on the second metal member 22 with the protrusion 23 therebetween while maintaining the position in the in-plane direction with the jig unit 40, and irradiates laser light 51 from the laser irradiation unit 50 to perform welding (FIG. 1B). The details are described below.

First, a case in which the protrusion 23 is formed by irradiating laser light 51 in the pretreatment process will be explained, using FIG. 1A-FIG. 16B.

The processing in the pretreatment unit 80 is a laser processing in which a protrusion 23 is formed by irradiating laser light 51 from the laser irradiation unit 50.

The jig unit 40 is freely movable between a first position (FIG. 1A) in which multiple (two in the illustrated example) first and second metal members 21, 22 are combined with each other with a space 30 therebetween, and a second position (FIG. 1B) in which the first and second metal members 21, 22 are superposed. The control unit 60 moves the jig unit 40 to the first position and holds the first and second metal members 21, 22 in a combined state with a space 30 therebetween. Next, the control unit 60 causes the pretreatment unit 80 to form a protrusion 23 (FIG. 1A). Then, the control unit 60 moves the jig unit 40 from the first position to the second position and welds the first and second metal members 21, 22 in a superposed state with the protrusion 23 therebetween (FIG. 1B).

FIGS. 1A and 1B illustrate the region where the two first and second metal members 21, 22, which are vertically disposed, are welded. The second metal member 22 on the lower side is placed on an unillustrated welding die.

The jig unit 40 comprises a pawl member 41 that can be freely inserted between the first and second metal members 21, 22, and a drive member 42 that moves the pawl member 41 forward and backward with respect to between the first and second metal members 21, 22. The end surface on the insertion side of the pawl member 41 is formed in a tapered shape. The drive member 42 is configured from an air cylinder, etc. As illustrated in FIG. 1A, the pawl member 41 moved forward with the drive member 42 and inserted between the first and second metal members 21, 22. The jig unit 40 moves to the first position to hold the first and second metal members 21, 22 in a combined state with a space 30 therebetween. As illustrated in FIG. 1B, the pawl member 41 is moved backward with the drive member 42 and is pulled out from between the first and second metal members 21, 22. The jig unit 40 moves to the second position to superpose the first and second metal members 21, 22.

The laser irradiation unit 50 is disposed above the first metal member 21. The laser irradiation unit 50 is configured from a well-known laser irradiation device. The laser irradiation unit 50 irradiates laser light 51 on the front surface 21a of the first metal member 21. The laser irradiation unit 50 comprises a pivotable mirror, and is capable of scanning the laser light 51 along any trajectory, such as a linear shape, a curved shape, a circular shape, or an arc shape. The laser light 51 may be irradiated at a point without scanning. The laser irradiation unit 50 can also freely adjust the amount of heat input to the object to be welded, such as the laser output, the scanning speed, and the expansion/contraction of the spot diameter.

The laser welding device 10 disposes multiple (two in the illustrated example) clamp members 70 spaced apart in the surface direction of the first and second metal members 21, 22. The clamp members 70 clamp the first and second metal members 21, 22 during welding. The clamp members 70 may employ any appropriate configuration. The clamp members 70 of the illustrated example comprises an upper pressing portion 71 that is disposed above the first metal member 21, and a lower pressing portion 72 that is disposed below the second metal member 22. Two upper pressing portions 71 are attached to an upper clamp arm 73, and two lower pressing portions 72 are attached to a lower clamp arm 74. The upper pressing portions 71 and the upper clamp arm 73 are disposed outside of the scanning range of the laser light 51. The upper clamp arm 73 and the lower clamp arm 74 are driven by an unillustrated fluid pressure cylinder, such as a hydraulic cylinder. The upper clamp arm 73 is moved toward the first metal member 21 and the lower clamp arm 74 is moved toward the second metal member 22 by the fluid pressure cylinder. The upper pressing portions 71 and the lower pressing portions 72 sandwich and clamp the first and second metal members 21, 22. The lower clamp arm 74 further comprises a locating pin 137 that can be freely inserted in a locating hole 131 for positioning formed in each of the first and second metal members 21, 22. The locating pin 137 is provided to hold the position of the first metal member 21 in the in-plane direction, and to hold the first metal member 21 superposed on the second metal member 22 while maintaining the position in the in-plane direction.

Figure 2A:
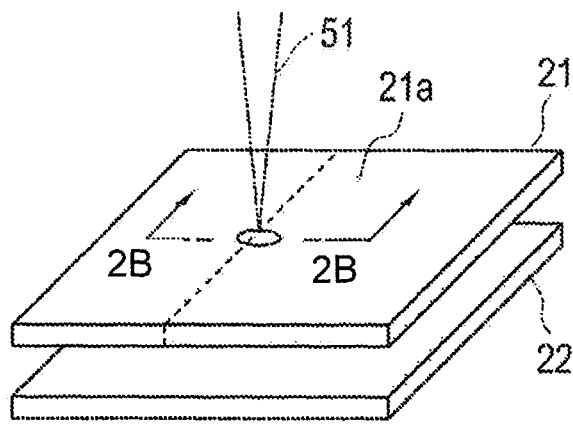
FIGS. 2A-2F are a schematic views explaining the procedure of a laser welding method.
Figure 2B:
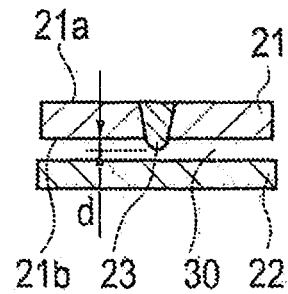
Figure 2C:
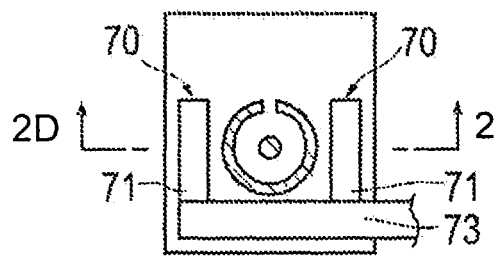
Figure 2D:
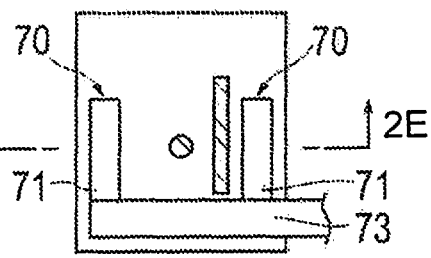
Figure 2E:
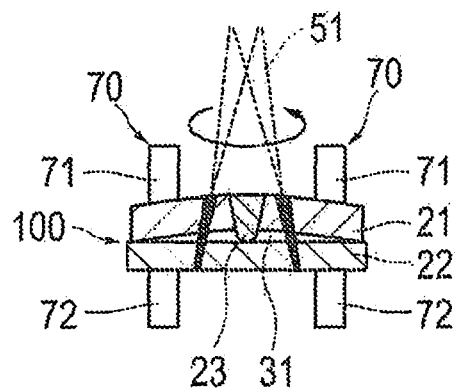
Figure 2F:
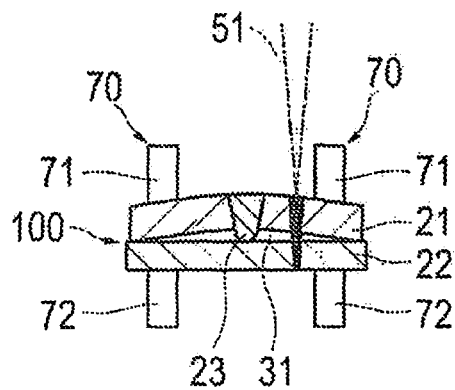

FIGS. 2A-2F are schematic views explaining the procedure of a laser welding method; FIGS. 2A and 2B are a perspective view illustrating the state of the pretreatment process and a cross-sectional view along the 2B-2B line in FIG. 2A; FIGS. 2C and 2D are plan views illustrating the state of the welding process and a cross-sectional view along the 2D-2D line in FIG. 2C. FIGS. 2E and 2F are plan views illustrating another state of the welding process and a cross-sectional view along the 2F-2F line in FIG. 2E.

First, laser light 51 is irradiated on the front surface 21a of the first metal member 21 to form on the back surface 21a a protrusion 23 that bulges from the back surface 21b (pretreatment process), as illustrated in FIGS. 2A and 2B. The bulging dimension d of the protrusion 23 from the back surface 21b may be appropriately selected from a range that meets the object to suppress the generation of a blow hole, such as 0.05 mm-0.3 mm. Forming a protrusion with this dimension by press-molding is practically impossible from viewpoints such as the accuracy of press-molding, the complex shapes, and etc., of press-molded products.

Then, the first metal member 21 in which the protrusion 23 has been formed is superposed on the second metal member 22 (corresponding to the other metal member) with the protrusion 23 therebetween, as illustrated in FIGS. 2C and 2D or FIGS. 2E and 2F. Then laser light 51 is irradiated on a region where the first and second metal members 21, 22 have been superposed to weld the first and second metal members to each other (welding process).

In the welding process, a gap 31 can be secured with the protrusion 23 being sandwiched between the superposed first and second metal members 21, 22. Zinc gas, which is a coating material vapor that is generated by the irradiation of laser light 51 during welding, is released through this gap 31. As a result, the generation of blow holes is suppressed, and favorable welds can be obtained.

This type of laser welding technique is suitable when achieving a welding connection of metal members for automobiles in which galvanized steel sheets are often used.

In the pretreatment process, the first and second metal members 21, 22 are held in a combined state with a space 30 therebetween to form a protrusion 23 (FIG. 1A, FIGS. 2A and 2B). Then, in the welding process, the first and second metal members 21, 22 are preferably transitioned from the pretreatment process state to a superposed state and welded (FIG. 1B, FIGS. 2C and D, or FIGS. 2E and 2F). The space 30 between the first and second metal members 21, 22 in the pretreatment process may be appropriately determined by giving consideration for a dimension with which the protrusion 23 formed in the first metal member 21 will not be joined to the second metal member 22, and a dimension that is moved during welding. An example of dimensions for the space 30 is 0.5 mm-5 mm.

In the pretreatment process, since a space 30 is opened between the first and second metal members 21, 22, a protrusion 23 can be reliably formed. In the welding process, since the first and second metal members 21, 22 are transitioned from an already combined state in the pretreatment process to a superposed state the operations from after forming the protrusion 23 to superposing the first and second metal members 21, 22 can be performed quickly. As a result, shortening the series of times required for the laser welding operation is possible.

In the pretreatment process, the first and second metal members 21, 22 are preferably held in a combined state with a space 30 therebetween, and in the welding process, the first and second metal members 21, 22 are preferably superposed, by a mechanical mechanism.

This is because holding the state of the first and second metal members 21, 22 in the pretreatment process, holding the state of the first and second metal members 21, 22 in the welding process, and transitioning the state of the first and second metal members 21, 22 from the pretreatment process to the welding process, can be reliably performed.

In the welding process, the first and second metal members 21, 22, which are superposed with a protrusion 23 therebetween, are preferably clamped at each welding spot.

By clamping at each welding spot, a gap 31 between the first and second metal members 21, 22 during welding can be secured or corrected for each spot. As a result, favorable welds can be obtained regardless of the positions of the weld spots, and the welding quality of the product can be improved.

The first and second metal members 21, 22 are preferably clamped by a plurality of clamp members 70 that are disposed spaced apart in the surface direction of the first and second metal members 21, 22, and the clamping is preferably performed on a welding spot by positioning at least one protrusion 23 between a pair of clamp members 70.

The gap 31 between the first and second metal members 21, 22 during welding may be regulated to the size of the protrusion 23. The size of the gap 31 thereby becomes uniform regardless of the positions of the welding spots. As a result, uniform welds can be obtained regardless of the positions of the weld spots, and the welding quality of the product can be improved.

In the welding process, the laser light 51 is preferably irradiated so as to surround the protrusion 23 (FIGS. 2C and 2D).

This is because the distance between the position where the laser light 51 is irradiated and the protrusion 23 during welding will be nearly equal, and the size of the gap 31 will be uniform regardless of the position where the laser light 51 is irradiated. As a result, more favorable welds can be obtained.

However, the present invention does not limit the trajectory of the laser light 51 in the welding process. The invention can be applied without any problem even when linear, as illustrated in FIGS. 2E and 2F.

Figure 3A:
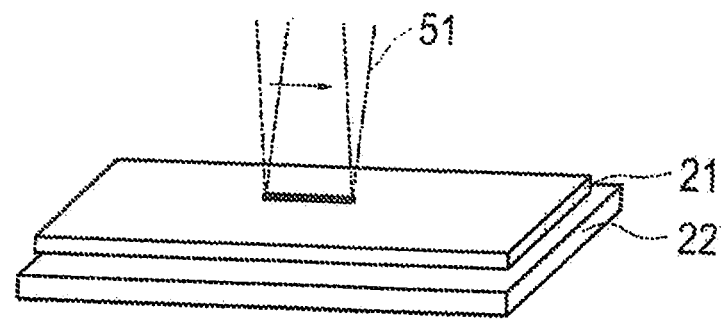
FIGS. 3A-3C are perspective views illustrating examples of the shapes of the protrusion that is formed in the pretreatment process.
Figure 3B:
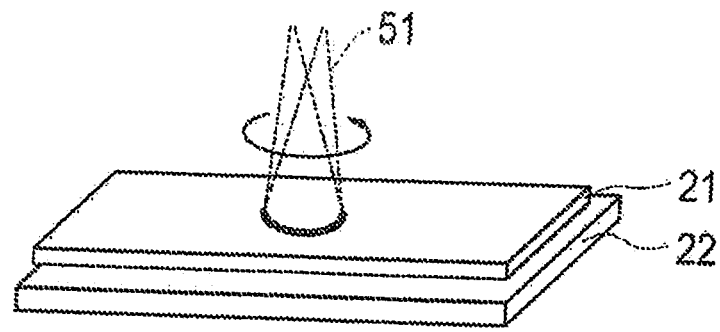
Figure 3C:
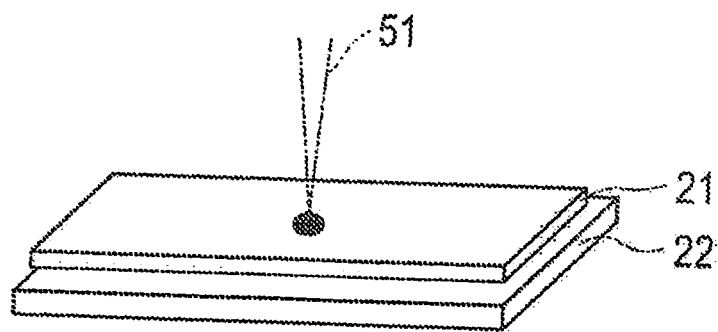

FIGS. 3A-3C are perspective views illustrating examples of the shapes of the protrusion 23 that is formed in the pretreatment process.

In the pretreatment process, the protrusion 23 may be formed in a shape including a linear shape or a curved shape, as well as in a point shape. Specifically, an appropriate shape may be selected, such as a linear shape (FIG. 3A), a circular arc shape including a curved shape (FIG. 3B), and a circular shape or a point shape including a curved shape (FIG. 3C).

A protrusion 23 with a shape suitable for the welding space can thereby be formed.

Figure 4A:
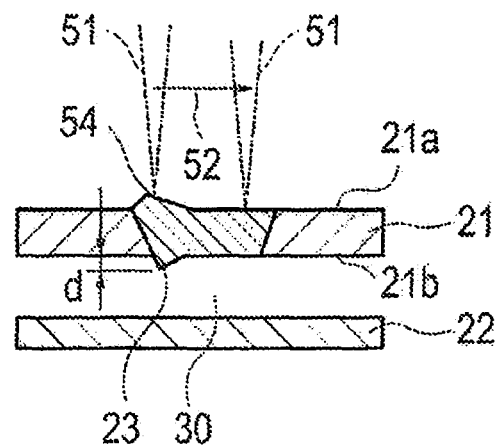
FIGS. 4A and 4B are a cross-sectional view and a plan view illustrating the manner in which a protrusion is formed by scanning laser light in the pretreatment process.
Figure 4B:
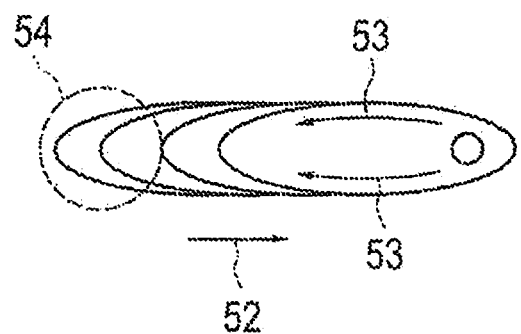

FIGS. 4A and 4B are a cross-sectional view and a plan view illustrating the manner in which a protrusion 23 is formed by scanning laser light 51 in the pretreatment process. The arrow 52 in the drawing indicates the direction in which the laser light 51 is scanned, that is, the welding direction; the arrow 53 indicates the flow of melted metal rearward in the welding direction; and the range surrounded by the broken line indicates the starting end portion of scanning 54.

Referring to FIGS. 4A and 4B, in the pretreatment process, a protrusion 23 can be formed on the starting end portion of scanning 54 by scanning a laser light 51.

When scanning a laser light 51, the temperature of the melted metal is higher on the terminal end side and lower on the starting end side of scanning. The melted metal flows rearward (arrow 53) in the welding direction (arrow 52) and the starting end portion of scanning 54 stabilizes and bulges due to the temperature distribution of the melted metal. Accordingly, a stable protrusion 23 can be formed on the starting end portion of scanning 54. As a result, the gap 31 between the first and second metal members 21, 22 during welding may be stably secured, and a favorable weld can be stably obtained. Also, the protrusion 23 can be extended in the direction in which the laser light 51 is scanned, and forming a protrusion 23 with a certain length is possible. From this point as well, the gap 31 between the first and second metal members 21, 22 during welding can be stably secured.

Examples of shapes in which a protrusion 23 is formed by scanning laser light 51 include a linear shape (FIG. 3A), a circular arc shape (FIG. 3B), and a circular shape.

A point shaped protrusion 23 (FIG. 3C) can be formed without scanning the laser light 51. In the case of a point shape (FIG. 3C), the center portion bulges due to the surface tension effect of the melted metal, which becomes the protrusion 23.

The scanning of the laser light 51 is preferably performed along a trajectory that keeps the starting end portion 54.

This is because the laser light 51 will not be irradiated again to the starting end portion 54. Therefore, since the protrusion 23 that is formed once will not be re-melted, a stable protrusion 23 can be formed.

Examples of a trajectory that keeps the starting end portion 54 include a linear shape (FIG. 3A) and a circular arc shape (FIG. 3B).

Figure 5A:
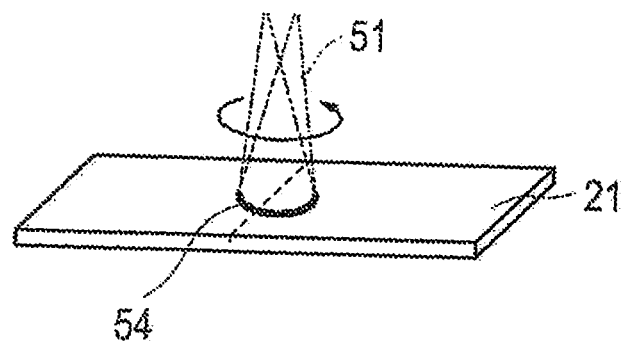
FIGS. 5A-5C are a perspective view, a cross-sectional view, and a bottom surface view illustrating the manner in which a protrusion is formed by performing the scanning of laser light along a circular arc shaped trajectory in the pretreatment process.
Figure 5B:
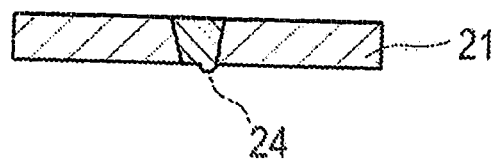
Figure 5C:
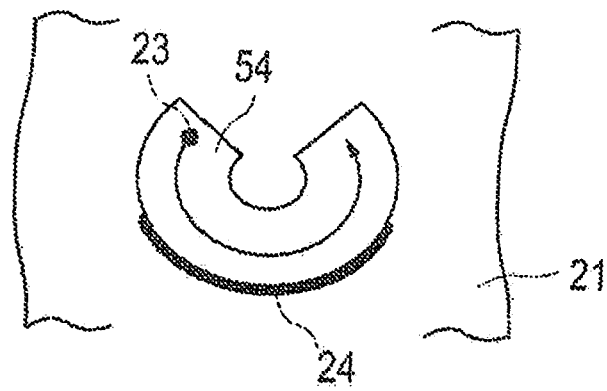

FIGS. 5A-5C are a perspective view, a cross-sectional view, and a bottom surface view illustrating the manner in which a protrusion 23 is formed by performing the scanning of laser light 51 along a circular arc shaped trajectory in the pretreatment process.

Referring to FIGS. 5A-5C, scanning of the laser light 51 may be performed along a circular arc shape to form a protrusion 24 that extends and bulges more along the outer perimeter than the inner perimeter side of the arc.

When performing the scanning of the laser light 51 along a circular arc trajectory, the temperature of the melted metal is high on the radially inner side and low on the radially outer side of the arc. The melted metal flows from the inside toward the outside and the outer perimeter of the arc bulges, due to the temperature distribution of the melted metal. Accordingly, the protrusion 24 in this case extends along the outer perimeter of the arc from the starting point, in addition to the starting end portion of scanning 54 of the laser light 51. The height of the protrusion 24 that extends along the outer perimeter of the arc is slightly lower than the height of the protrusion 23 as the starting end portion 54. Even if damage occurs to the protrusion 23 at the starting end portion 54, since the protrusion 24 is extending along the outer perimeter of the arc, the gap 31 between the first and second metal members 21, 22 can be stably secured.

In the case of a circular protrusion, the protrusion 23 at the starting point will be re-melted. However, a protrusion 24 that extends along the outer perimeter of a circle and bulges more than the inner perimeter side may be formed, in the same way as in the case of the circular arc shape. Since the protrusion 24 extents along the outer perimeter of the circle, the gap 31 between the first and second metal members 21, 22 can be stably secured.

FIGS. 6A-6E are explanatory views explaining the manner in which a larger weld pool 55 is formed on the terminal end side of the scanning of laser light 51, compared to the starting end side, in the pretreatment process.

Figure 6A:
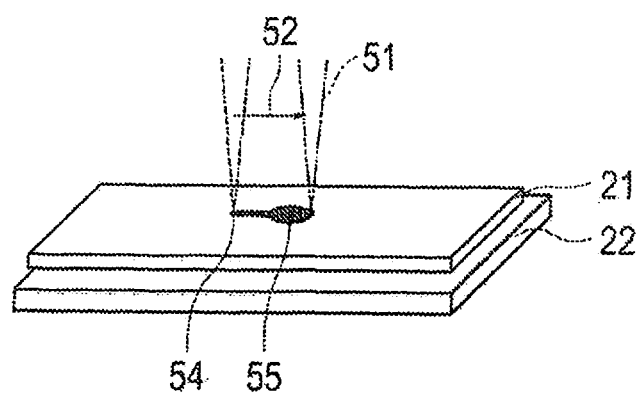
FIGS. 6A-6E are explanatory views explaining the manner in which a larger weld pool is formed on the terminal end side of the scanning of laser light, compared to the starting end side, in the pretreatment process.

Irradiating the laser light 51 so as to form a larger weld pool 55 on the terminal end side of the scanning of the laser light 51, compared to the starting end side, is preferable, as illustrated in FIG. 6A.

This is because the amount of melted metal flowing from the terminal end side toward the starting end side increases, so a more stable protrusion 23 can be formed on the starting end portion of scanning 54.

Figure 6B:
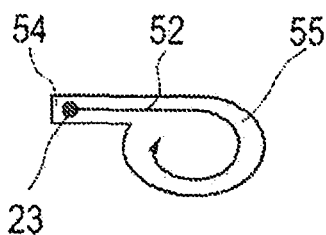
Figure 6C:
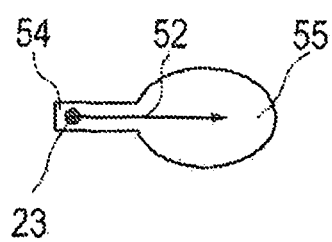
Figure 6D:
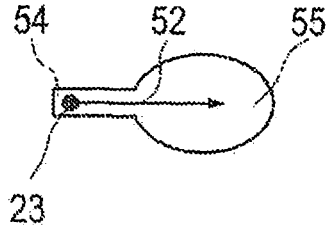
Figure 6E:
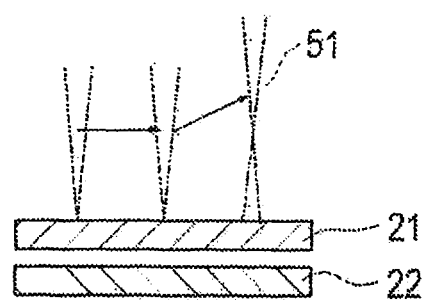

The following are examples of specific methods for forming the weld pool 55 described above. The shape of the laser light 51 at the terminal end side of scanning is changed from a linear shape to a circular shape to increase the heat input and form a large weld pool 55, as illustrated in FIG. 6B. The shape of the scanning of the laser light 51 is set to a linear shape and the scanning speed is reduced in the middle of scanning to increase the heat input and form a large weld pool 55, as illustrated in FIG. 6C. The shape of the scanning of the laser light 51 is set to a linear shape and the spot diameter is expanded in the middle of scanning to increase the irradiation range of the laser light 51 and form a large weld pool 55, as illustrated in FIGS. 6D and 6E.

The time to scan the laser light 51 on the front surface 21a of the first metal member 21 with a low heat amount prior to welding is equal to or greater than the time for the starting end portion 54 to solidify and form a protrusion 23. A protrusion 23 can thereby be reliably formed in the starting end portion 54, and the gap 31 between the first and second metal members 21, 22 can be stably secured, as illustrated in FIGS. 4A and 4B.

As described above, the laser welding method of the present embodiment comprises a pretreatment process and a welding process; in the pretreatment process, with the position of the first metal member 21 in the in-plane direction fixed, processing is performed from the front surface 21a of the first metal member 21 to form on the back surface 21b a protrusion 23 that bulges from the back surface. Then, in the welding process, the first metal member 21 in which the protrusion 23 has been formed is superposed on the second metal member 22 with the protrusion 23 therebetween while maintaining the position in the in-plane direction, and laser light 51 is irradiated on the superposed region to weld the first and second metal members 21, 22 to each other.

According to such a method, in the welding process, a gap 31 can be secured with the protrusion 23 being sandwiched between the superposed first and second metal members 21, 22. Zinc gas, which is generated by the irradiation of laser light 51 during welding, is released through this gap 31. As a result, the generation of blow holes is suppressed, and favorable welds can be obtained.

The processing in the pretreatment step is preferably a laser processing in which a protrusion 23 is formed by irradiating laser light 51.

According to such a method, the laser light 51 for welding the first and second metal members 21, 22 in the welding process can be used when forming a protrusion 23 on the first metal member 21 in the pretreatment process. In this manner, according to such a method, a protrusion 23 can be formed on the back surface 21b by only irradiating an existing laser light 51 on the front surface 21a of the first metal member 21, without using a new mechanical means. As a result, a protrusion 23 can be formed with an existing means.

In the pretreatment process, the first and second metal members 21, 22 are preferably held in a combined state with a space 30 therebetween while forming a protrusion 23, and in the welding process, the first and second metal members 21, 22 are preferably transitioned from the pretreatment process state to a superposed state and welded.

According to such a method, in the pretreatment process, since a space 30 is opened between the first and second metal members 21, 22, a protrusion 23 can be reliably formed. In the welding process, since the first and second metal members 21, 22 are transitioned from an already combined state in the pretreatment process to a superposed state the operations from after forming the protrusion 23 to superposing the first and second metal members 21, 22 can be performed quickly. As a result, shortening the series of times required for the laser welding operation is possible.

In the pretreatment process, the first and second metal members 21, 22 are preferably held in a combined state with a space 30 therebetween, and in the welding process, the first and second metal members 21, 22 are preferably superposed, by a mechanical mechanism.

According to such a method, holding the state of the first and second metal members 21, 22 in the pretreatment process, holding the state of the first and second metal members 21, 22 in the welding process, and transitioning the state of the first and second metal members 21, 22 from the pretreatment process to the welding process, can be reliably performed.

In the welding process, the first and second metal members 21, 22, which are superposed with a protrusion 23 therebetween, are preferably clamped at each welding spot.

According to such a method, by clamping at each welding spot, the gap 31 between the first and second metal members 21, 22 during welding can be secured or corrected for each spot. As a result, favorable welds can be obtained regardless of the positions of the weld spots, and the welding quality of the product can be improved.

The first and second metal members 21, 22 are preferably clamped by multiple clamp members 70 that are disposed spaced apart in the surface direction of the first and second metal members 21, 22, and the clamping is preferably performed on a welding spot by positioning at least one protrusion 23 between a pair of clamp members 70.

According to such a method, the gap 31 between the first and second metal members 21, 22 during welding may be regulated to the size of the protrusion 23. The size of the gap 31 thereby becomes uniform regardless of the positions of the welding spots. As a result, uniform welds can be obtained regardless of the positions of the weld spots, and the welding quality of the product can be improved.

In the welding process, the laser light 51 is preferably irradiated so as to surround the protrusion 23.

According to such a method, the distance between the position where the laser light 51 is irradiated and the protrusion 23 during welding will be nearly equal, and the size of the gap 31 will be uniform regardless of the position where the laser light 51 is irradiated. As a result, more favorable welds can be obtained.

In the pretreatment process, the protrusion 23 is preferably formed in a shape including a linear shape or a curved shape, or in a point shape.

According to such a method, a protrusion 23 with a shape suitable for the welding space can be formed.

In the pretreatment process, a protrusion 23 is preferably formed on the starting end portion of scanning 54 by scanning a laser light 51.

According to such a method, in the case of scanning a laser light 51, the starting end portion of scanning 54 will bulge stably; as a result, a stable protrusion 23 can be formed on the starting end portion of scanning 54. As a result, the gap 31 between the first and second metal members 21, 22 during welding may be stably secured, and a favorable weld can be stably obtained.

The scanning of the laser light 51 is preferably performed along a trajectory that keeps the starting end portion 54.

According to such a method, the laser light 51 will not be irradiated again to the starting end portion 54. Since the protrusion 23 that is formed once will not be re-melted, a stable protrusion 23 can be formed.

Scanning of the laser light 51 is preferably performed along a circular arc shape trajectory to form a protrusion 24 that extends and bulges more along the outer perimeter than the inner perimeter side of the arc.

According to such a method, since the protrusion 24 extends along the outer perimeter of the arc in accordance with the scanning of the laser light 51, the gap 31 between the first and second metal members 21, 22 can be stably secured.

Irradiating the laser light 51 so as to form a larger weld pool 55 on the terminal end side of the scanning of the laser light 51, compared to the starting end side, is preferable.

According to such a method, the amount of melted metal flowing from the terminal end side toward the starting end side increases, so a more stable protrusion 23 can be formed on the starting end portion of scanning 54.

The time to scan the laser light 51 is preferably the time for the starting end portion 54 to solidify and form a protrusion 23.

According to such a method, a protrusion 23 can be reliably formed in the starting end portion 54. As a result, the gap 31 between the first and second metal members 21, 22 can be stably secured.

The metal-plated steel plate is a galvanized steel sheet. By applying a galvanized steel sheet, favorable welds suppressing the generation of blow holes can be obtained.

The laser welding device 10 of the present embodiment comprises a jig unit 40, a pretreatment unit 80, a laser irradiation unit 50, and a control unit 60, and the control unit 60 holds the position of the first metal member 21 in the in-plane direction fixed with the jig unit 40. Then, the control unit 60 causes the pretreatment unit 80 to perform processing from the front surface 21a of the first metal member 21 to form on the back surface 21b, which is the other side, a protrusion 23 that bulges from the back surface 21b. Then, the control unit 60 holds the first metal member 21 superposed on the second metal member 22 with the protrusion 23 therebetween while maintaining the position in the in-plane direction with the jig unit 40, and irradiates laser light 51 from the laser irradiation unit 50 to perform welding.

According to such a configuration, a gap 31 can be secured with the protrusion 23 being sandwiched between the superposed first and second metal members 21, 22. Zinc gas, which is generated by the irradiation of laser light 51 during welding, is released through this gap 31. As a result, the generation of blow holes is suppressed, and favorable welds can be obtained.

The processing in the pretreatment unit 80 is preferably a laser processing in which a protrusion 23 is formed by irradiating laser light 51 from the laser irradiation unit 50.

According to such a configuration, the laser light 51 that is irradiated by the laser irradiation unit 50 for welding the first and second metal members 21, 22 in the welding process can be used when forming a protrusion 23 on the first metal member 21. In this manner, according to such a configuration, a protrusion 23 can be formed on the back surface 21b by only irradiating a laser light 51 from an existing laser irradiation unit 50 on the front surface 21a of the first metal member 21, without using a new mechanical means. As a result, a protrusion 23 can be formed with an existing configuration.

The jig unit 40 is freely movable between a first position in which the first and second metal members 21, 22 are combined with each other with a space 30 therebetween, and a second position in which the first and second metal members 21, 22 are superposed. The control unit 60 moves the jig unit 40 to the first position and holds the first and second metal members 21, 22 in a combined state with a space 30 therebetween. Next, the control unit 60 causes the pretreatment unit 80 to form a protrusion 23. Then, the control unit 60 moves the jig unit 40 from the first position to the second position and welds the first and second metal members 21, 22 in a superposed state with the protrusion 23 therebetween.

Since a space 30 is opened between the first and second metal members 21, 22 in the first position, the jig unit 40 can reliably form a protrusion 23. With the jig unit 40 moving from the first position to the second position, the operations from after forming the protrusion 23 to superposing the first and second metal members 21, 22 can be performed quickly. As a result, shortening the series of times required for the laser welding operation is possible.

The jig unit 40 preferably holds the first and second metal members 21, 22 in a combined state with a space 30 therebetween in the first position, and preferably superposes the first and second metal members 21, 22 in the second position, by a mechanical mechanism.

According to such a configuration, holding the state of the first and second metal members 21, 22 in the pretreatment process, holding the state of the first and second metal members 21, 22 in the welding process, and transitioning the state of the first and second metal members 21, 22 from the pretreatment process to the welding process, can be reliably performed.

The welded member of the present embodiment has a shape in which the first metal member 21 in which a protrusion 23 has been formed is superposed on the second metal member 22 with the protrusion 23 therebetween, and the region in which the first and second metal members 21, 22 are superposed forms a welding connection.

According to such a welded member, a gap 31 can be secured with the protrusion 23 being sandwiched between the superposed first and second metal members 21, 22. Zinc gas, which is generated by the irradiation of laser light 51 during welding, is released through this gap 31. As a result, the generation of blow holes is suppressed, becoming a welded member 100 comprised of favorable welds.

Test Example 1

A galvanized steel sheet with a top plate t of 1.4 mm and a bottom plate t of 0.65 mm was selected as a target plate set.

First, the bottom plate was set on the jig.

In order to form a protrusion with a stable height, a spacer (pawl member 41) that is interlocked with the clamp member 70 was disposed to enter between the top and bottom plates, and the top plate was set.

As the first pass for forming the protrusions 23, 24, laser welding was executed in a range of a laser output of about +15% of that required to penetrate the top plate, spot diameter y of 550-800 μm, rate of 100 mm/s, and in a curved shape. Protrusion (bulges) 23, 24 are formed at the starting end portion 54 as well as the outer perimeter curved portion.

Next, the top plate and the bottom plate are clamped. At this time, the spacer is retracted in conjunction with the operation of the clamp member 70, and the top and bottom plates are held in a state in which a gap 31, amounting to the height d of the protrusions 23, 24, is opened.

Laser welding is performed at a heat amount that is capable of penetrating and welding the top and bottom plates. The zinc gas generated at this time flows out from the gap 31 formed by the protrusion 23, 24, so a defect did not occur at the weld.

Test Example 2

Next, the time to scan the laser light 51, and the time required for the starting end portion 54 to solidify and form a protrusion 23 were considered.

Figure 7A:
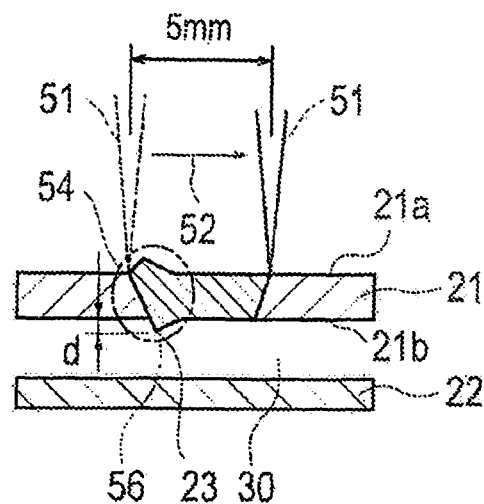
FIGS. 7A-7C are explanatory views explaining test example 2.
Figure 7B:
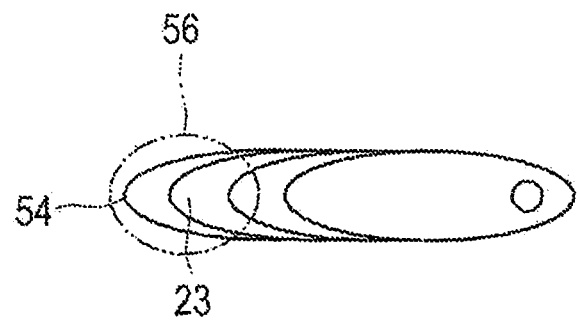
Figure 7C:
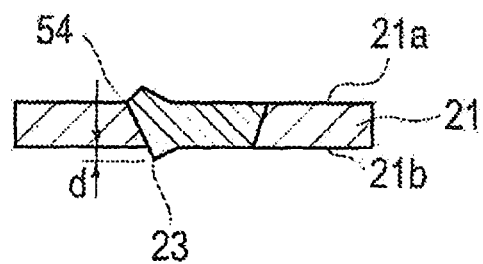

FIGS. 7A-C are explanatory views explaining test example 2, and FIG. 7A is a cross-sectional view illustrating the manner in which a protrusion 23 is formed by scanning laser light 51 in the pretreatment process. FIG. 7B is a plan view illustrating the state of the back surface 21b of the first metal member 21 after laser light 51 scanning has ended. FIG. 7C is a cross-sectional view illustrating the state of the first metal member 21 after laser light 51 scanning has ended.

The time to scan the laser light 51 is equal to or greater than the time for the starting end portion 54 to solidify and form a protrusion 23.

The scan length of the laser light 51 upon forming a protrusion 23 in the test example 1 is set to 5 mm, as illustrated in FIG. 7A. When the scan length is set to 5 mm, the starting end portion 54 is solidified and a protrusion 23 is formed within the time from the start to the end of the scanning of the laser light 51, as illustrated in FIG. 7B. In this manner, if the time to scan the laser light 51 is set to equal to or greater than the time for the starting end portion 54 to solidify and form a protrusion 23, the protrusion 23 can be reliably formed, as illustrated in FIG. 7C.

The status of the back surface 21b of the first metal member 21 when the scan length of the laser light 51 was changed to 5 mm was observed with a high-speed camera (not shown) to evaluate the convex portion described above.

When the scan length of the laser light 51 was set to 5 mm, the starting end portion 54 was already solidified when the scanning of the laser light 51 ended, and a protrusion 23 that protrudes at a height d from the back surface 21b is formed. This is because, by scanning the laser light 51, a flow of melted metal is formed rearward in the scanning direction of the laser light 51, due to metal vapor and temperature difference.

Comparative Example

Figure 8A:
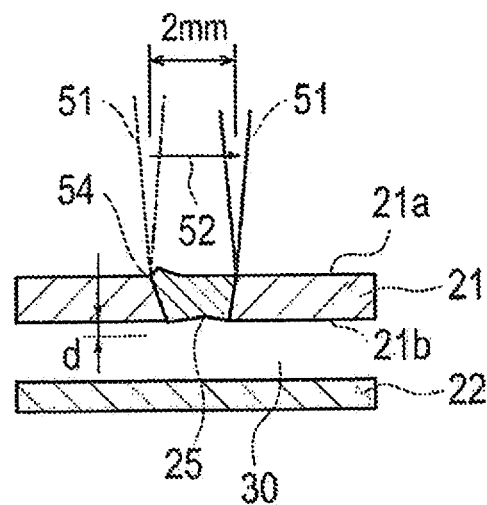
FIGS. 8A-8C are explanatory views explaining a comparative example with respect to test example 2.
Figure 8B:
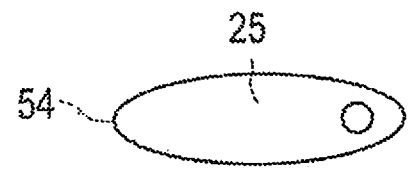
Figure 8C:
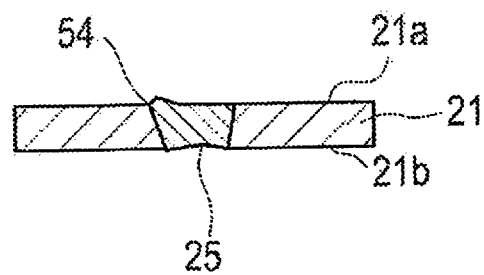

FIGS. 8A-8C are explanatory views explaining a comparative example with respect to test example 2, and FIG. 8A is a cross-sectional view illustrating the manner in which laser light 51 is scanned in order to form a protrusion in the pretreatment process. FIG. 8B is a plan view illustrating the state of the back surface 21b of the first metal member 21 after laser light 51 scanning has ended. FIG. 8C is a cross-sectional view illustrating the state of the first metal member 21 after laser light 51 scanning has ended.

The scan length of the laser light 51 upon forming a protrusion in the test example 1 is set to 2 mm, as illustrated in FIG. 8A. When the scan length is set to 2 mm, the starting end portion 54 is not solidified and the entire scanning area is melted within the time from the start to the end of the scanning of the laser light 51, as illustrated in FIG. 8B. In this manner, if the time to scan the laser light 51 is set shorter than the time for the starting end portion 54 to solidify, the back surface 21b of the first metal member 21 is pulled and dented by the front surface 21a due to the surface tension, and a recess 25 is formed instead of a protrusion, as illustrated in FIG. 8C.

The status of the back surface 21b of the first metal member 21 when the scan length of the laser light 51 was changed to 2 mm was observed with a high-speed camera to evaluate the convex portion described above.

When the scan length of the laser light 51 was set to 2 mm, the starting end portion 54 was not solidified when the scanning of the laser light 51 ended, so a convex portion is not formed. This is because, in this case, the scanning of the laser light 51 is ended and the rearward flow in the scanning direction of the laser light 51 is eliminated, so the melted metal on the back surface 21b side is sucked up onto the front surface 21a side and dented.

From test 1, test 2, and the comparative example, the time required for scanning the laser light 51 differed depending on the plate thickness of the first metal member 21, the processing conditions of the laser light 51 (scanning speed, laser output, etc.), or the like, but the trend was confirmed to be the same.

Modified Example

Figure 9A:
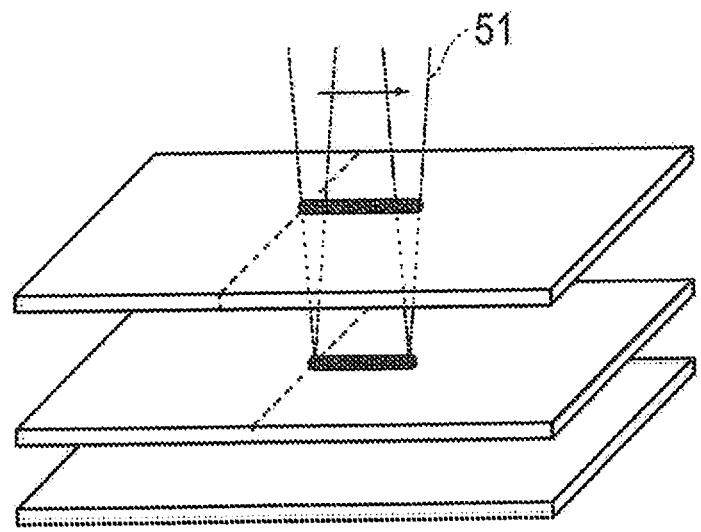
FIGS. 9A and 9B are a perspective views illustrating the state of the pretreatment process in the case that n (n≥3) metal members are welded to each other, and a cross-sectional view of FIG. 9A.
Figure 9B:
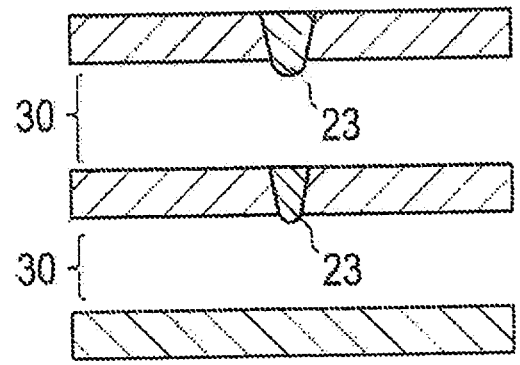

FIGS. 9A and B is a perspective view illustrating the state of the pretreatment process in the case that n (n≥3) metal members are welded to each other, and a cross-sectional view of FIG. 9A.

A laser welding technique using two, first and second metal members 21, 22 was explained, but the present invention is not limited to this case, and can be applied when welding n (n≥3) metal members to each other as well.

When welding n (n≥3) metal members to each other by irradiating a laser light 51 on a region where n metal members have been superposed, in the pretreatment process, first, at least (n−1) metal members are disposed with spaces 30 therebetween. The laser light 51 irradiated on the uppermost metal member is sequentially penetrated through (n−2) metal members, and protrusions 23 are formed on (n−1) metal members. In the illustrated example, a protrusion 23 is formed on each of the uppermost metal member and the second metal member from the top.

According to such a method, even when superposing and welding three or more metal members, a gap 31 can be secured with the protrusion 23 being sandwiched between each of the superposed metal members. The coating material vapor that is generated by the irradiation of laser light 51 is released through these gaps 31. As a result, the generation of blow holes is suppressed, and favorable welds can be obtained.

FIGS. 10A-10C are views illustrating a modified example of a jig unit 40 comprising a mechanical mechanism.

The jig unit 40 can be appropriately modified as long as it is freely movable between a first position in which a plurality of metal members are combined with each other with a space 30 therebetween, and a second position in which the plurality of metal members are superposed.

The jig unit 40 illustrated in FIGS. 10A-10C comprises a pawl member 111 that can be freely inserted between the first and second metal members 21, 22, and a drive mechanism 112 that moves the pawl member 111 forward and backward with respect to between the first and second metal members 21, 22. The drive mechanism 112 comprises a cylinder 114 that is operated by fluid pressure, or the like, that clamps and unclamps the clamp member 113, and a linking mechanism 116 that is coupled to an actuating rod 115 of the cylinder 114 and moves the pawl member 111 forward and backward in conjunction with the movement of the operating rod 115. The linking mechanism 116 comprises an operating bar 117 that moves with the operating bar 115, a cam portion 118 that is provided to the operating bar 117 and with which the proximal end of the pawl member 111 comes in contact, and a spring 119 that biases to the pawl member 111 a resilient force in a direction to press the proximal end of the pawl member 111 to the cam portion 118.

When setting the second metal member 22 on the lower side, the clamp member 113 is unclamped, and the pawl member 111 is moved backward and pulled out from between the first and second metal members 21, 22 (FIG. 10A). In the pretreatment process, the operating rod 115 of the cylinder 114 is extended midway, and the cam portion 118 of the operating bar 117 that moved with the operating rod 115 is put in contact with the proximal end of the pawl member 111. The pawl member 111 is moved forward against the resilient force of the spring 119, and inserted between the first and second metal members 21, 22. The jig unit 40 thereby moves to the first position to hold the first and second metal members 21, 22 in a combined state with a space 30 therebetween (FIG. 10B). In the welding process, the operating rod 115 of the cylinder 114 is extended, and the first and second metal members 21, 22 are clamped by the clamp member 113. The cam portion 118 of the operating bar 117 that moved with the operating rod 115 goes beyond the proximal end of the pawl member 111. The pawl member 111 is moved backward with the resilient force of the spring 119, and pulled out from between the first and second metal members 21, 22. The jig unit 40 moves to the second position to superpose the first and second metal members 21, 22 (FIG. 10C).

Figure 11A:
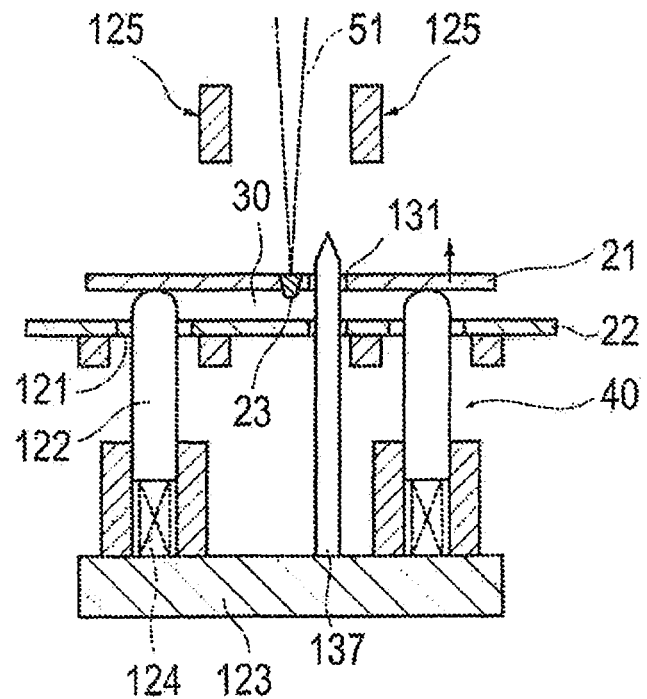
FIGS. 11A and 11B are views illustrating another modified example of a jig unit comprising a mechanical mechanism.
Figure 11B:
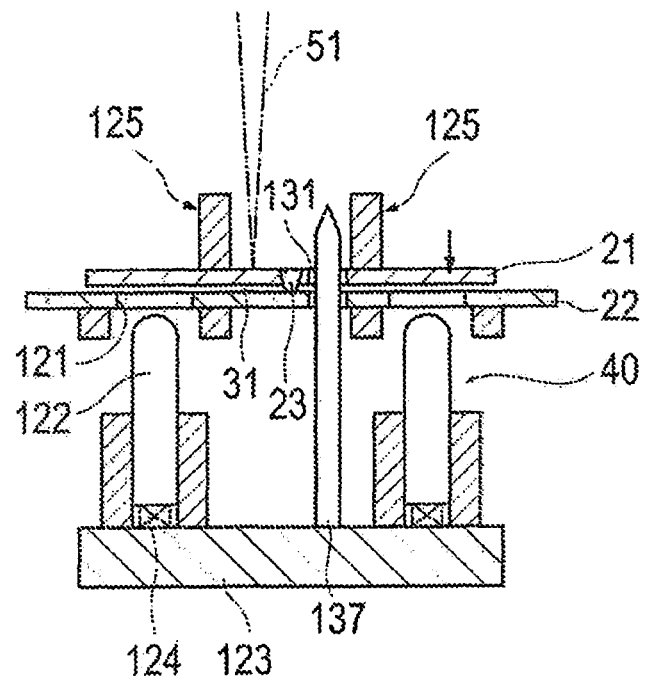

FIGS. 11A and 11B are views illustrating another modified example of a jig unit 40 comprising a mechanical mechanism.

The jig unit 40 illustrated in FIGS. 11A and 11B comprises a pin 122 that can be freely inserted in a through-hole 121 formed in the second metal member 22 on the lower side, and a spring 124 that is provided between the pin 122 and a base 123, and that biases to the pin 122 a resilient force that pushes the pin 122 upward. The pin 122 is installed to push up the first metal member 21 on the upper side. The resilient force of the spring 124 is set to be weaker than the force with which the clamp member 125 presses the first metal member 21. Further, the jig unit 40 comprises a locating pin 137 for positioning the first and second metal members 21, 22 in the in-plane direction, which can be freely inserted in locating holes 131 for positioning formed in each of the first and second metal members 21, 22.

In the pretreatment process, the pin 122 to which the resilient force of the spring 124 has been biased pushes up the first metal member 21 through the through-hole 121 of the second metal member 22. The jig unit 40 thereby moves to the first position to hold the first and second metal members 21, 22 in a combined state with a space 30 therebetween (FIG. 11(A)). In the welding process, the first metal member 21 is pressed by a clamp member 125, and the pin 122 is pushed down against the resilient force of the spring 124. The jig unit 40 thereby moves to the second position to superpose the first and second metal members 21, 22 (FIG. 11(B)).

Figure 12A:
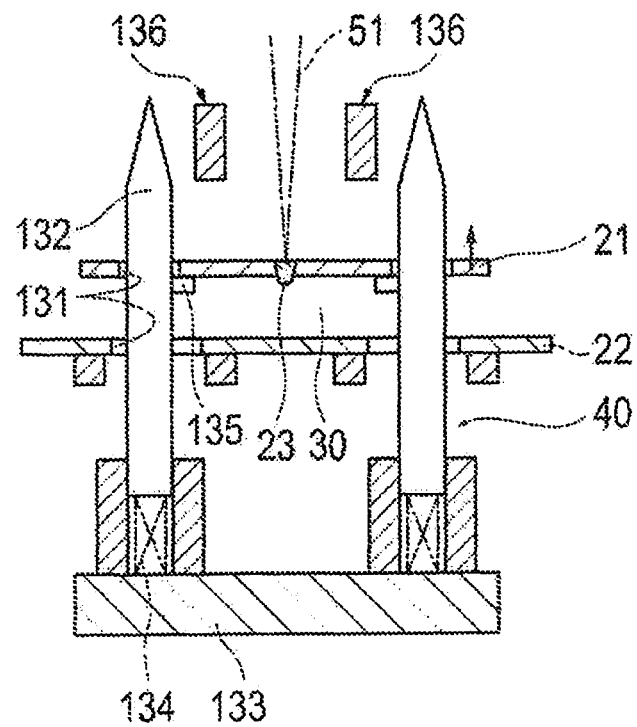
FIGS. 12A and 12B are views illustrating yet another modified example of a jig unit comprising a mechanical mechanism.
Figure 12B:
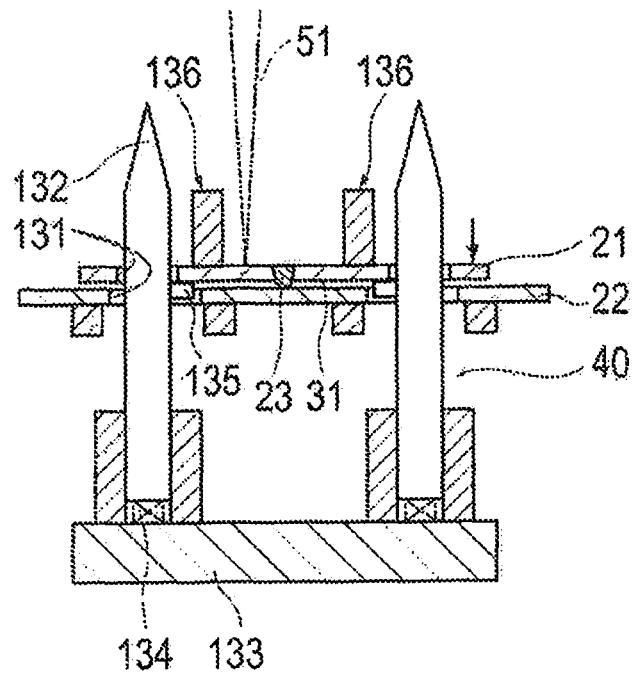

FIGS. 12A and 12B are views illustrating yet another modified example of a jig unit 40 comprising a mechanical mechanism.

The jig unit 40 illustrated in FIGS. 12A and 12B comprises a locating pin 132 that can be freely inserted in locating holes 131 for positioning formed in each of the first and second metal members 21, 22, a spring 134 that is provided between the locating pin 132 and a base 133 and biases to the locating pin 132 a resilient force that pushes the locating pin 132 upward, and a projection 135 that is provided to the locating pin 132 and that can be freely abutted only to the first metal member 21 on the upper side. The resilient force of the spring 134 is set to be weaker than the force with which the clamp member 136 presses the first metal member 21.

In the pretreatment process, the locating pin 132 to which the resilient force of the spring 134 has been biased is inserted in the locating hole 131 of the first and second metal members 21, 22, and the projection 135 pushes up the first metal member 21. The jig unit 40 thereby moves to the first position to hold the first and second metal members 21, 22 in a combined state with a space 30 therebetween (FIG. 12A). In the welding process, the first metal member 21 is pressed by a clamp member 136, and the locating pin 132 is pushed down against the resilient force of the spring 134. The jig unit 40 thereby moves to the second position to superpose the first and second metal members 21, 22 (FIG. 12B).

FIGS. 13A and 13B are views illustrating a jig unit 40 that utilizes electromagnetic force.

The jig unit 40 may transition the state of the jig unit 40 by an electromagnetic force, in addition to a mechanical mechanism.

The jig unit 40 illustrated in FIGS. 13A and 13B is configured from a clamp member 141 given magnetic force. The magnetic force is set to be weaker than the bonding force of the welding of the first and second metal members 21, 22.

In the pretreatment process, the clamp member 141 fixes the first metal member 21 in a position above the second metal member 22 while adsorbing the first metal member 21 with magnetic force. The jig unit 40 thereby moves to the first position to hold the first and second metal members 21, 22 in a combined state with a space 30 therebetween (FIG. 13A). In the welding process, the clamp member 141 is fully pressed. The jig unit 40 thereby moves to the second position to superpose the first and second metal members 21, 22 (FIG. 13B). After welding, the clamp member 141 can be lifted to disengage from the first metal member 21.

The jig unit 40 can hold the first and second metal members 21, 22 in a combined state with a space 30 therebetween in the pretreatment process, and superpose the first and second metal members 21, 22 in the welding process, by the above-described electromagnetic force as well.

FIGS. 14A and 14B are views illustrating a modified example of a jig unit 40 that utilizes electromagnetic force.

The jig unit 40 illustrated in FIGS. 14A and 14B is configured by imparting a charge with the same polarity to the first and second metal members 21, 22. The reaction force due to the charge is set to be weaker than the force with which the clamp member 151 presses the first metal member 21.

In the pretreatment process, a reaction force caused by the charge acts between the first metal member 21 and the second metal member 22. The jig unit 40 thereby moves to the first position to hold the first and second metal members 21, 22 in a combined state with a space 30 therebetween (FIG. 14A). In the welding process, the clamp member 151 is fully pressed. The jig unit 40 thereby moves to the second position to superpose the first and second metal members 21, 22 (FIG. 14B).

Figure 15A:
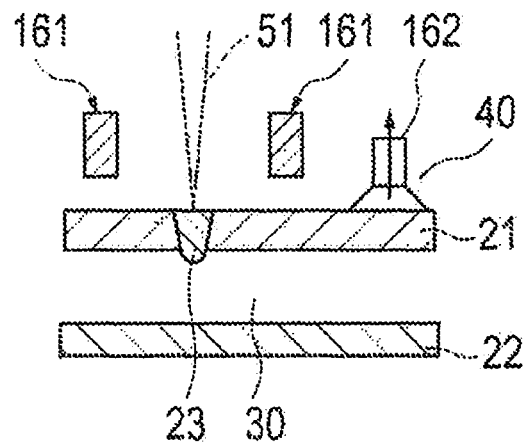
FIGS. 15A and 15B are views illustrating a jig unit that utilizes pneumatic force.
Figure 15B:
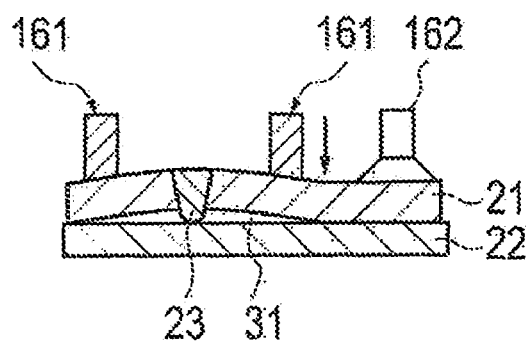

FIGS. 15A and 15B are views illustrating a jig unit 40 that utilizes pneumatic force.

The jig unit 40 may transition the state of the jig unit 40 by a pneumatic force, in addition to a mechanical mechanism and an electromagnetic force.

The jig unit 40 illustrated in FIGS. 15A and 15B comprises a clamp member 161 and a suction pad 162 for adsorbing the first metal member 21. The suction pad 162 can switch between supplying negative pressure and opening to the atmosphere.

In the pretreatment process, the suction pad 162 fixes the first metal member 21 in a position above the second metal member 22 while adsorbing the first metal member 21 with negative pressure. The jig unit 40 thereby moves to the first position to hold the first and second metal members 21, 22 in a combined state with a space 30 therebetween (FIG. 15A). In the welding process, the clamp member 161 is fully pressed. The jig unit 40 thereby moves to the second position to superpose the first and second metal members 21, 22 (FIG. 15B). After welding, the suction pad 162 can be lifted to disengage from the first metal member 21.

The jig unit 40 can hold the first and second metal members 21, 22 in a combined state with a space 30 therebetween in the pretreatment process, and superpose the first and second metal members 21, 22 in the welding process, by the above-described pneumatic force as well.

Figure 16A:
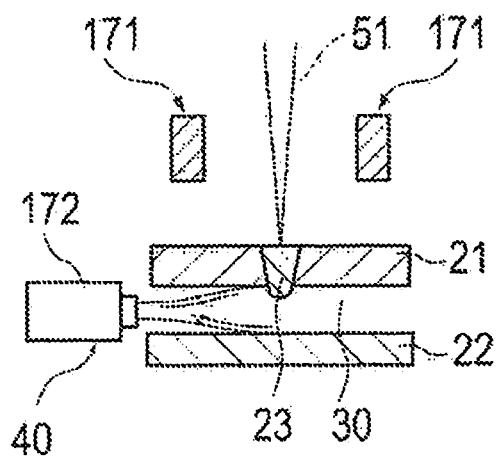
FIGS. 16A and 16B are views illustrating a modified example of a jig unit that utilizes pneumatic force.
Figure 16B:
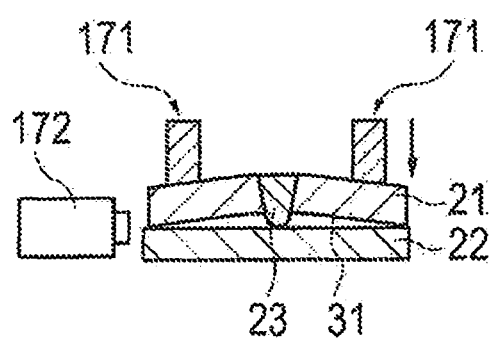

FIGS. 16A and 16B are views illustrating a modified example of a jig unit 40 that utilizes pneumatic force.

The jig unit 40 illustrated in FIGS. 16A and 16B comprises a clamp member 171 and an air supply unit 172 for supplying compressed air between the first and second metal members 21, 22. The air supply unit 172 can switch between supplying compressed air and stopping the supply.

In the pretreatment process, compressed air is supplied from the air supply unit 172 between the first and second metal members 21, 22 to separate the first and second metal members 21, 22. The jig unit 40 thereby moves to the first position to hold the first and second metal members 21, 22 in a combined state with a space 30 therebetween (FIG. 16A). In the welding process, the supply of compressed air from the air supply unit 172 is stopped and the clamp member 171 is fully pressed. The jig unit 40 thereby moves to the second position to superpose the first and second metal members 21, 22 (FIG. 16B).

Next, a case in which a protrusion 26 is formed by a mechanical processing in the pretreatment process will be explained, using FIGS. 17A and 17B and FIGS. 18A and 18B.

Figure 17A:
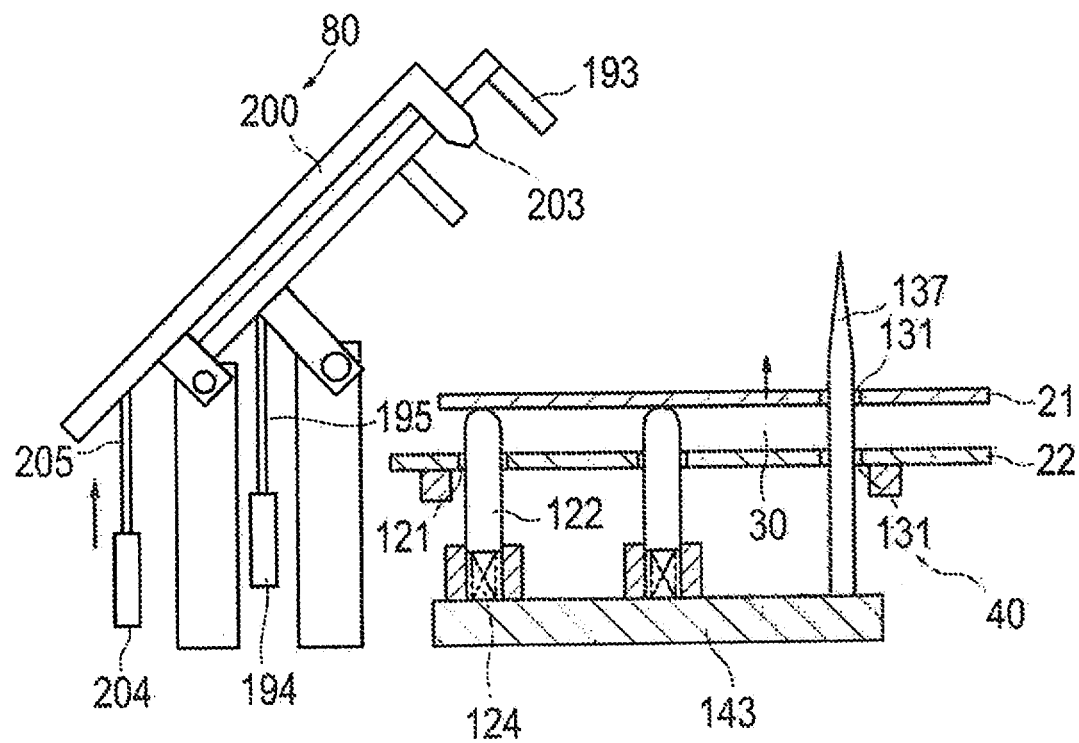
FIGS. 17A and 17B are views illustrating a modified example of the pretreatment process in which a protrusion is formed by mechanically deforming one metal member.
Figure 17B:
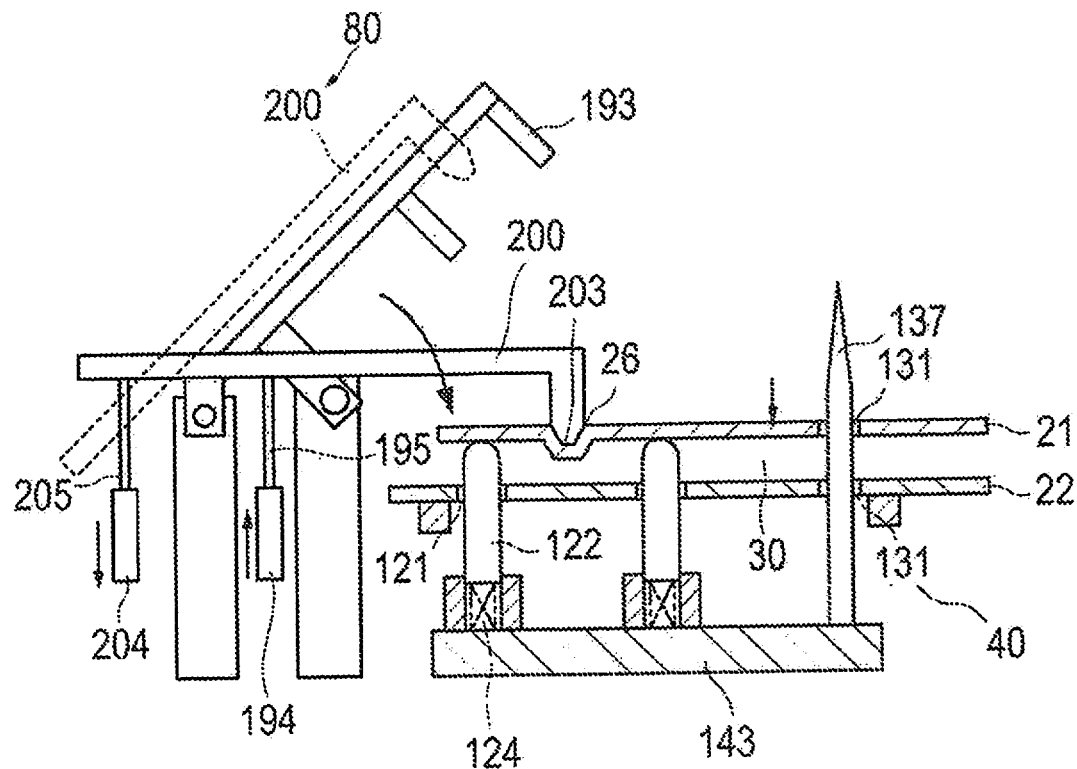
Figure 18A:
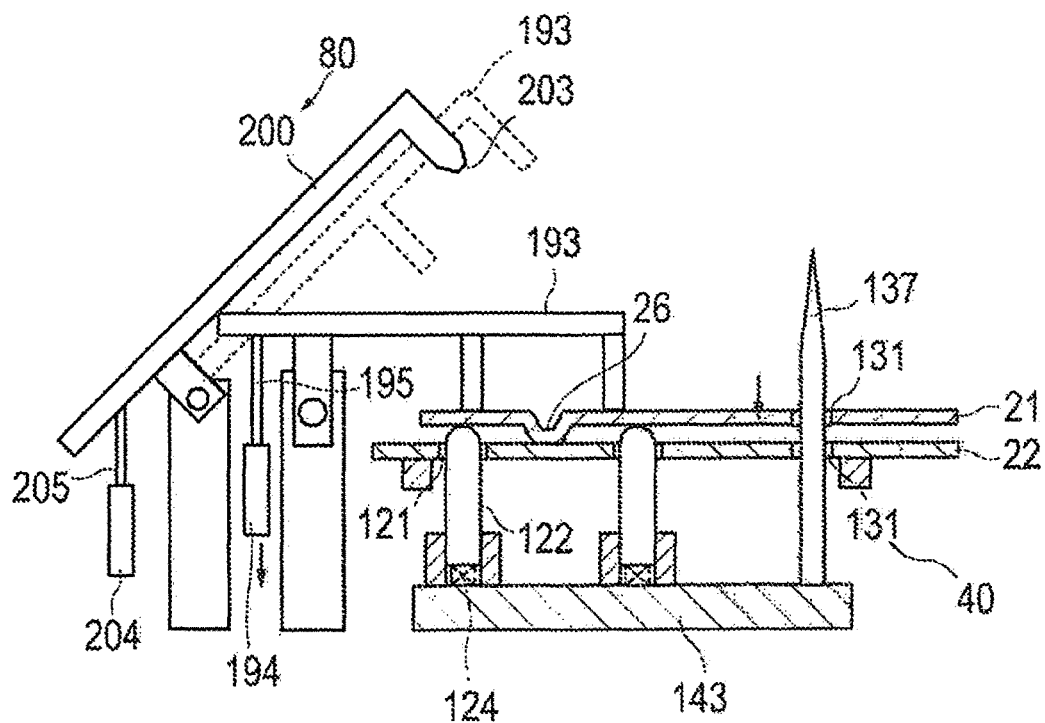
FIGS. 18A and 18B are views following FIGS. 17A and 17B, and are explanatory views explaining a modified example of the pretreatment process in which a protrusion is formed by mechanically deforming one metal member.
Figure 18B:
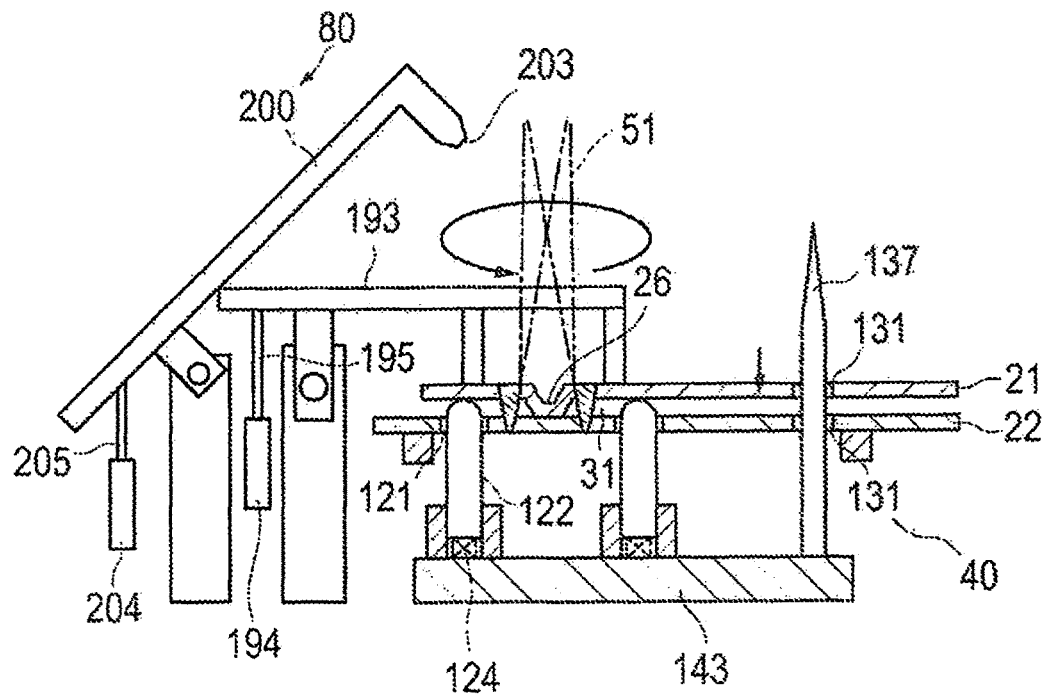

FIGS. 17A and 17B are views illustrating a modified example of the pretreatment process in which a protrusion 26 is formed by mechanically deforming the first metal member 21. FIGS. 18A and 18B are views following FIGS. 17A and 17B, and are explanatory views explaining a modified example of the pretreatment process in which a protrusion 26 is formed by mechanically deforming the first metal member 21.

The pretreatment unit 80 is configured from a punch 200 that presses the front surface 21a of the first metal member 21 and mechanically processes a protrusion 26 that protrudes from the back surface 21b, as illustrated in FIGS. 17A and 17B. The processing in the pretreatment unit 80 of the present modified example is a mechanical process that forms a protrusion 23 with a punch 200.

The jig unit 40 illustrated in FIGS. 17A and 17B comprises a pin 122 that can be freely inserted in a through-hole 121 formed in the second metal member 22 on the lower side, and a spring 124 that is provided between the pin 122 and a base 143, and that biases to the pin 122 a resilient force that pushes the pin 122 upward. Then, the jig unit 40 comprises a locating pin 137 for positioning the first and second metal members 21, 22 in the in-plane direction, which can be freely inserted in locating holes 131 for positioning formed in each of the first and second metal members 21, 22. The jig unit 40 also comprises a clamp member 193 for clamping the first and second metal members 21, 22 during welding. The pin 122 is installed to push up the first metal member 21 on the upper side. The resilient force of the spring 124 is set to be weaker than the force with which the clamp member 193 presses the first metal member 21.

The punch 200 may employ any appropriate configuration. The punch 200 of the illustrated example is driven by a cylinder 204 that is operated by, for example, fluid pressure. The punch is moved toward the first metal member 21, and moved in a direction away from the first metal member 21 by the cylinder 204. The cylinder is connected to the punch 200 via an operating rod 205.

The clamp member 193 may employ any appropriate configuration. The clamp member 193 of the illustrated example is driven by a cylinder 194 that is operated by, for example, fluid pressure. The clamp member is moved toward the first metal member 21, and moved in a direction away from the first metal member 21 by the cylinder 194. The cylinder is connected to the clamp member 193 via an operating rod 195.

In the pretreatment process, first, the locating pin 132 is inserted in the locating hole 131 of the first and second metal members 21, 22, and the pin 122 to which the resilient force of the spring 124 has been biased pushes up the first metal member 21 through the through-hole 121 of the second metal member 22. The jig unit 40 thereby moves to the first position to hold the first and second metal members 21, 22 in a combined state with a space 30 therebetween (FIG. 17A).

Then, the punch 200 presses the front surface 21a of the first metal member 21 with a distal end portion 203 and mechanically forms a protrusion 26 that protrudes from the back surface 21b. The jig unit 40 thereby moves to the second position where the pin 122 is pressed by the punch 200 via the first metal member 21, and the first metal member 21 is pushed up by the resilient force of the spring 124 (FIG. 17B).

Then, the punch 200 is moved in a direction away from the front surface 21a of the first metal member 21, while the clamp 193 is moved toward the front surface 21a of the first metal member 21.

In the welding process, the first metal member 21 is pressed by a clamp member 193, and the pin 122 is pushed down against the resilient force of the spring 124. The jig unit 40 thereby moves to a third position to superpose the first and second metal members 21, 22 (FIGS. 18A and 18B).

Even with a protrusion 25 that is mechanically formed in the first metal member 21 by pressing the punch 200 described above, in the welding process, a gap 31 can be secured with the protrusion 26 being sandwiched between the superposed first and second metal members 21, 22. Zinc gas, which is a coating material vapor that is generated by the irradiation of laser light 51 during welding, is released through this gap 31. As a result, the generation of blow holes is suppressed, and favorable welds can be obtained.

As described above, in the laser welding method of a modified example of the pretreatment process of the present embodiment, the processing in the pretreatment process is a mechanical process that forms a protrusion 23 with a punch 200.

According to such a method, forming a protrusion 26 on the back surface 21*b* by mechanically pressing the front surface 21*a* of the first metal member 21 with a punch 200 is possible. As a result, a protrusion 26 can be formed on the back surface 21*b* of the first metal member 21 reliably and in a short time.

In the laser welding device 10 of a modified example of the pretreatment process of the present embodiment, the processing in the pretreatment unit 80 is preferably a mechanical process that forms a protrusion 23 with a punch 200.

According to such a configuration, the pretreatment unit 80 is able to form a protrusion 26 on the back surface 21*b* by mechanically pressing the front surface 21*a* of the first metal member 21. As a result, the pretreatment unit 80 can form a protrusion 26 on the back surface 21*b* of the first metal member 21 reliably and in a short time.

A case in which multiple metal members are formed from metal-plated steel plates was explained, but a coating material vapor could be generated as long as a coating material covers one surface of the steel plates to be welded. Therefore, the present invention can be applied when welding metal-plated steel plates, in which one side or both sides of the base metal of at least one metal member of the plurality of metal members is covered.

The present application is based on Japanese Patent Application No. 2013-028442 submitted on Feb. 15, 2013, and the contents disclosed therein have been referenced and incorporated herein as a whole.

The invention claimed is:

1. A laser welding method for welding a plurality of metal members to each other by irradiating laser light on a region where the plurality of metal members have been superposed, wherein at least one of the plurality of metal members is formed from a metal-plated steel plate in which a base metal has been covered with a coating material that has a melting point lower than the base metal, comprising:
   a pretreatment process in which the plurality of metal members are held in a combined state with a space therebetween wherein of the plurality of metal members are fixed in an in-plane direction by at least one locating pin and processing is performed from a first side surface of a first metal member of the plurality of metal members to form on a second side surface of the first metal member opposite the first side surface, a protrusion that bulges from the second side surface, the protrusion being formed by a laser process, the locating pin penetrating through the plurality of metal members, and
   a laser welding process in which the first metal member in which the protrusion has been formed is superposed on a second metal member of the plurality of metal members with the protrusion therebetween, and the fixed positions of the plurality of metal members are maintained in the in-plane direction by the least one locating pin while the plurality of metal members are laser welded to each other by irradiating laser light on the region where the plurality of metal members are superposed, to laser weld the plurality of metal members to each other while maintaining the fixed positions of the plurality of metal members in the in-plane direction by the least one locating pin,
   the in-plane direction being parallel to surfaces of the metal members that face each other such that the locating pin is adjacent to a side wall of each of the metal members, and
   in the laser welding process, the plurality of metal members being clamped at welding spots on opposite sides of the protrusion such that the metal members are in contact with each other at the welding spots while a gap is maintained between the metal members at the protrusion, the welding spots not being in contact with the protrusion.

2. The laser welding method according to claim 1, wherein the processing in the pretreatment process is a laser processing in which the protrusion is formed by irradiating laser light.

3. The laser welding method according to claim 1, wherein
   the plurality of metal members are held in a combined state with a space therebetween in the pretreatment process, and the plurality of metal members are superposed in the welding process, by a mechanical mechanism, an electromagnetic force, or a pneumatic force.

4. The laser welding method according to claim 2, wherein
   when welding 3 metal members to each other by irradiating a laser light on the region where 3 of the metal members have been superposed,
   in the pretreatment process, 2 metal members are disposed with spaces therebetween, and irradiated laser light is sequentially penetrated through 1 of the metal members, and the protrusions are formed on 2 metal members.

5. The laser welding method according to claim 1, wherein
   the plurality of metal members are clamped by a plurality of clamp members that are disposed spaced apart in the surface direction of the metal members, and
   the welding spots are clamped by positioning at least one of the protrusions between a pair of clamp members.

6. The laser welding method according to claim 1, wherein
   in the laser welding process, laser light is irradiated so as to surround the protrusion.

7. The laser welding method according to claim 1, wherein
   in the pretreatment process, the protrusion is formed in a shape including a linear shape or a curved shape, or in a point shape.

8. The laser welding method according to claim 2, wherein
   in the pretreatment process, the protrusion is formed at the starting end portion of scanning by scanning laser light.

9. The laser welding method according to claim 8, wherein
   the scanning of laser light is performed along a trajectory that keeps the starting end portion.

10. The laser welding method according to claim 9, wherein
    scanning of the laser light is performed along a circular arc shape trajectory to form a protrusion that extends and bulges more along the outer perimeter than the inner perimeter side of the arc.

11. The laser welding method according to claim 9, wherein
    laser light is irradiated so as to form in a larger weld pool on the terminal end side of the scanning of laser light, compared to the starting end side.

12. The laser welding method according to claim 9, wherein
   the time to scan the laser light is equal to or greater than the time for the starting end portion to solidify and form the protrusion.

13. The laser welding method according to claim 1, wherein
   the metal-plated steel plate is a galvanized steel sheet.

* * * * *